United States Patent
Goebel et al.

(10) Patent No.: US 9,178,224 B2
(45) Date of Patent: Nov. 3, 2015

(54) SEALING DESIGN FOR STAMPED PLATE FUEL CELLS

(71) Applicant: GM Global Technology Operations LLC, Detroit, MI (US)

(72) Inventors: Steven G. Goebel, Victor, NY (US); Matthew J. Beutel, Webster, NY (US); Jeffrey A. Rock, Rochester Hills, MI (US); Robert Thompson, Lockport, NY (US); Jeff D. Williams, Tonawanda, NY (US); Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 13/832,148

(22) Filed: Mar. 15, 2013

(65) Prior Publication Data

US 2014/0272661 A1 Sep. 18, 2014

(51) Int. Cl.
*H01M 8/02* (2006.01)
*H01M 8/24* (2006.01)

(52) U.S. Cl.
CPC .......... *H01M 8/0258* (2013.01); *H01M 8/0254* (2013.01); *H01M 8/242* (2013.01); *H01M 8/248* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 5,464,700 A | 11/1995 | Steck et al. | |
| 7,291,414 B2 | 11/2007 | Goebel et al. | |
| 7,368,192 B2 | 5/2008 | Pettit et al. | |
| 7,462,415 B2 | 12/2008 | Goebel et al. | |
| 7,517,372 B2 | 4/2009 | Sennoun et al. | |
| 7,592,088 B2 * | 9/2009 | Rock et al. | 429/480 |
| 7,935,453 B2 | 5/2011 | Beutel et al. | |
| 2009/0197148 A1 * | 8/2009 | Sato et al. | 429/35 |
| 2010/0159294 A1 | 6/2010 | Fly et al. | |
| 2012/0015280 A1 * | 1/2012 | Cha et al. | 429/479 |

* cited by examiner

*Primary Examiner* — Patrick Ryan
*Assistant Examiner* — Christopher Domone
(74) *Attorney, Agent, or Firm* — Dinsmore & Shohl LLP

(57) ABSTRACT

A fuel cell stack of at least two fuel cells, each fuel cell having a unitized electrode assembly (UEA) including a membrane electrode assembly (MEA), a sub-gasket and gas diffusion media (DM), and positioned between modified stamped field-flow plates. The sub-gasket frames the MEA resulting in an overlap area between the MEA and the inner perimeter of the sub-gasket. The UEA is disposed between a pair of stamped flow-field plates which align in adjacent fuel cells to form a bipolar plate. The bipolar plate has an active region, an overlap region and a seal region. The active region is configured with channel and land features which provide reactant flow channels and coolant passages for the fuel cell. The configuration of features in the overlap region, however, is modified from the configuration in the active region so that the overlap region may sustain sufficient mechanical sealing pressure, and to prevent coolant and reactant bypass without impeding coolant and reactant flow in the active area. Modified channel and land feature configurations for the overlap region are exemplified.

20 Claims, 5 Drawing Sheets

SEALING DESIGN FOR STAMPED PLATE FUEL CELLS

TECHNICAL FIELD

Embodiments of the present invention relate generally to a bipolar plate for use in a fuel cell environment, and more particularly to a stamped bipolar plate that includes improved sealing properties.

BACKGROUND

Hydrogen is a very attractive fuel because it is clean and can be used to efficiently produce electricity in a fuel cell. A hydrogen fuel cell is an electro-chemical device that includes an anode and a cathode separated by an electrolyte. The anode receives hydrogen gas and the cathode receives oxygen, typically via an air flow. The hydrogen gas is dissociated at the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. In a PEMFC, the electrolyte may be a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. In one preferred form, the bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates may also include flow channels through which a cooling fluid flows.

Various techniques are known in the art for fabricating the bipolar plates. In one design, the bipolar plates are made of a composite material, such as graphite, where two plate halves are separately molded and then glued together so that anode flow channels are provided at one side of one of the plate halves, cathode flow channels are provided at an opposite side of the other plate half and cooling fluid flow channels are provided between the plate halves. In another design, two separate plate halves are stamped and then welded together so that anode flow channels are provided at one side of one of the plate halves, cathode flow channels are provided at an opposite side of the other plate half and cooling fluid flow channels are provided between the plate halves.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because a typical stack may be configured to have at least some of the fuel cells electrically coupled in series, if one of the fuel cells stops performing, the operation of the entire fuel cell stack may be jeopardized.

A fuel cell stack typically includes a seal that extends around the active area of the fuel cells between the stack headers and the active area for each fuel cell to prevent gas leakage from the stack. Therefore, in order to get the cathode flow, the anode flow and the cooling fluid flow from the respective inlet header into the active area of the fuel cell, it is necessary for the flow channels to go through the seal area without affecting seal integrity. Typically holes or tunnels are provided through the bipolar plate around the seals, which requires a bend in the flow channels so that they line up with the flow channels in the active area. This bend in the cathode and anode flow channels provided an area that water could accumulate and be trapped which has a tendency to close the flow channel and reduce the flow of reactant gas thereto. Therefore, a better technique for traversing the seal area of the fuel cell stack is needed.

A common configuration for the Unitized Electrode Assembly, UEA, of a fuel cell has an overlap region between a thrifted membrane (a membrane sized to fit short of the plate perimeter seal) and sub-gasket (a "window frame" of polymer film such as polyethylene naphthalate, PEN) at the perimeter of the active area. Membrane thrifting is done for a few reasons: 1) the membrane material is not compatible to be in contact with the seal or plate material due to its high acidity, so the membrane needs to be covered or separated by a plastic film in the fuel cell seal region; 2) the membrane material is expensive, so by thrifting the membrane material from the perimeter of the cell, less membrane material is required; 3)

the membrane material is not compatible with water-glycol coolant due to high membrane swelling, so the membrane needs to be pulled in from the coolant header. However, this configuration creates an interface between the membrane and sub-gasket at the perimeter of the active area that must be sealed. In particular, it is important that the active area perimeter along the flow-directional edge be sealed, whereas it is important that coolant, anode and cathode flow along the perimeter of the active region orthogonal to the flow-directional edge not be impeded as they traverse the overlap region. Due to the composition and dimensional change with hydration of the membrane, adhesive bonding between the membrane and sub-gasket is not reliable. To ensure reliable sealing in this overlap region, mechanical pressure is necessary.

In this regard, stamped plate design poses greater challenges than molded plate design as the stamped features are necessarily reflected on both sides of the stamped plate half. For molded plates, regions can be filled with solid composite material as needed. For example, the land of a stamped plate always creates a coolant channel behind it, while a molded plate can be solid to avoid creating coolant channels where they are not desired. Another consideration is that providing good mechanical support in the overlap region is more critical for fuel cells using thinner diffusion media (DM), as thinner DM is less able to distribute compression load across channel spans. Thinner DM is desirable to reduce the size of the fuel cell which is particularly important for packaging into automotive applications. Hence, an improved seal design is needed for sealing the perimeter of an active area of a fuel cell manufactured with stamped plates.

SUMMARY

Accordingly, the present investigators have developed a stamped plate fuel cell design which overcomes the deficiencies and challenges noted above, and which provides fuel cells having increased efficiency and economy, particularly in vehicle applications.

A stamped plate fuel cell design according to the instant disclosure provides a modified configuration of channel and land features in an overlap region at the perimeter of the active region, capable of sustaining a level of mechanical pressure sufficient to seal the overlap region to substantially prevent coolant and reactant bypass without substantially impeding coolant and reactant flow in the active region of the fuel cell. In particular the overlap region of the active area perimeter along the flow-directional edges comprises the modified configuration according to the disclosure. The overlap regions at each end orthogonal to the flow-directional edges will generally not comprise the modified configurations of features since it is desirable that the coolant, anode and cathode fluid flows not be impeded by plate or UEA features as they traverse the overlap region of the non-flow-directional edges.

According to one embodiment, a fuel cell stack of at least two fuel cells is provided. Each fuel cell comprises a UEA comprising a thrifted electrolyte membrane disposed between a pair of electrodes to form an MEA. The MEA is framed on a sub-gasket such than an overlap exists between an outer perimeter of the MEA and an inner perimeter of the sub-gasket defining an overlap area. The framed MEA is disposed between a pair of gas DM. The UEA is disposed between a pair of stamped flow-field plates, such that flow-field plates of adjacent fuel cells align to form a bipolar plate comprising an active region, a seal region, and an overlap region, said overlap region disposed between an outer perimeter of the active region and an inner perimeter of the seal region and substantially corresponding in area to the overlap area, wherein the active region comprises a configuration of channel and land features and the overlap region comprises a modified configuration of channel and land features which permit a level of mechanical pressure sufficient to seal the overlap area and to substantially prevent coolant and reactant bypass without impeding coolant and reactant flow in the active area.

Another embodiment of the disclosure provides a stamped flow-field plate for a fuel cell. The stamped flow-field plate comprises an active region, an overlap region and a seal region, the overlap region abutting an outer perimeter of the active region and extending to an inner perimeter of the seal region, the active region being configured with channel and land features such that alignment between adjacent flow-field plates forms a bipolar plate comprising a configuration of reactant channel and coolant passages in the active region and a modified configuration of features in the overlap region, the modified configuration comprising one or more of: coolant blocking channel features; reactant blocking land features; substantially isolated coolant passages, each isolated coolant passage in fluid communication with active region coolant flow by only a single interconnection positioned to permit efficient venting of coolant passages necessary to effectuate coolant fill; wherein all features are designed to substantially avoid channel-over-channel and land-over-land alignment between adjacent plates and further wherein the channel and land features of the overlap region have substantially the same pitch and height as the channel and land features of the active region.

These and additional aspects are described in the Figures and Detailed Description set forth below.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
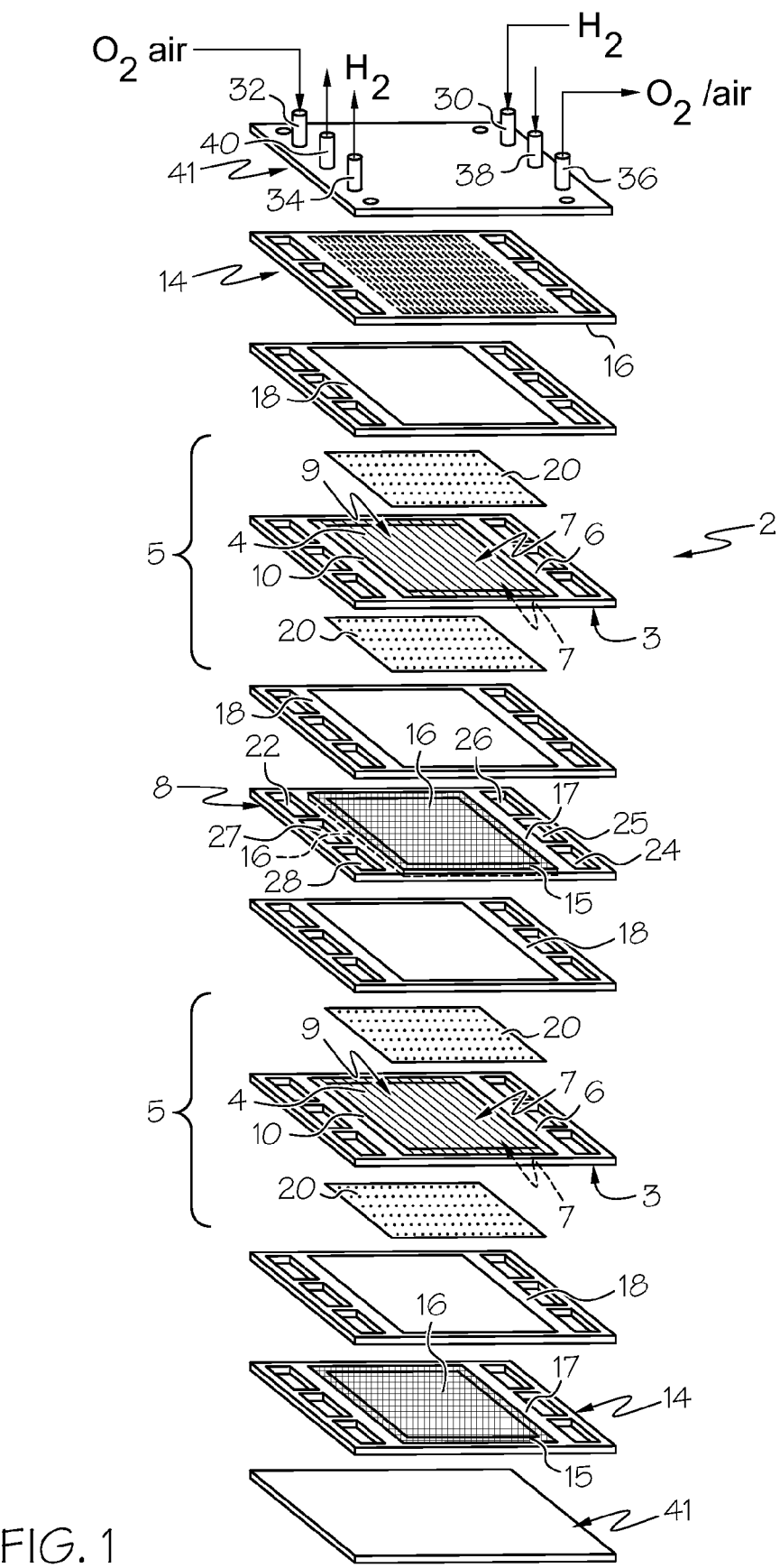
FIG. 1 is an exploded schematic view of an exemplary fuel cell stack according to the disclosure.

FIG. 1 depicts an exemplary fuel cell stack 2 according to the present disclosure. For simplicity, only a two-cell stack (i.e. having only one bipolar plate) is illustrated although it is understood that a typical fuel cell stack includes many more such cells and bipolar plates. Although for simplicity the present figures depict MEAs of a catalyst coated membrane (CCM) design, it should be understood that the MEA may have an adapted catalyst coated diffusion media (CCDM) design if desired. The UEA mentioned earlier is, in accordance with the instant disclosure, the assembly specifically of the MEA, gas DM and sub-gasket. The UEA may also include an elastomer seal. The membranes of the instant disclosure are thrifted membranes, which is an optimized membrane smaller in at least one dimension than a perimeter seal.

A schematic fuel cell stack 2 of generally typical architecture is depicted in FIG. 1 in order to illustrate relative component locations in accordance with the disclosure. The fuel cell stack 2 includes at least one UEA 5, which is an assembly of the thrifted membrane 4 and electrodes 7 (together an MEA 9), gas DM 20, and a sub-gasket 3 having an inner perimeter that extends from a seal area 6 a distance beneath the MEA 9 to support and frame the MEA 9, and creating an overlap area 10 between the MEA 9 and the sub-gasket 3. The DM 20, for example carbon or graphite diffusion papers, are disposed on both sides of the MEA 9 and sub-gasket 3, and in specific embodiments, extend through the overlap area 10 and co-terminate with the MEA 9, covering both the MEA 9 and sub-gasket 3 of the overlap area 10. For clarity it is noted that herein the term "overlap area 10" refers to the defined overlap between the active area 11 and the subgasket 3 in the context of the MEA, whereas "overlap region 15" refers to the corresponding region on the stamped plates.

Unipolar endplates 14 have an active region 16 configured with stamped channel and land features (not depicted), and an overlap region 15 corresponding in relative position and area to the overlap area 10 of the UEA 5 and having a modified configuration of stamped channel and land features (not depicted) relative to the active region 16. Adjacent unipolar endplates 14 align to form an electrically conductive bipolar plate 8, having an active region 16 containing reactant channels and coolant channels (not depicted) formed from alignment of the feature configuration of the active regions of the adjacent end plates, which function to distribute reactant and coolant to the MEA 9, an overlap region 15 abutting the active region 16 and containing modified channels, passages and volumes formed from alignment of the modified configuration of the overlap region of adjacent endplates according to the disclosure, and a seal region 12 at the periphery of the overlap region 15. A seal region is an area around a perimeter with elastomeric seal to prevent cross-over leakage between an anode and cathode, and over-board leaks.

The UEAs 5 and the bipolar plate 8 are stacked together between a pair of clamping plates 41, and a pair of unipolar end plates 14. The clamping plates 41 are electrically insulated from the end plates 14, for example, by a gasket or a dielectric coating (not shown). The unipolar end plates 14 and the bipolar plate 8 include active regions 16 for distributing reactants, such as hydrogen gas and oxygen/air, to the electrodes of the MEAs 9, overlap regions 15 for pressurized sealing while substantially preventing reactant and coolant bypass without impeding reactant and coolant flow in the active region 16. The active region 16 abuts the overlap region 15.

The fuel cell stack 2 may include nonconductive gaskets 18 to provide seals and electrical insulation between the components of the fuel cell stack 2. However, it should be appreciated that depending on what other sealing and insulating options are employed and the nonconductive gaskets 18 may be included or not, as desired.

The sub-gasket 3, bipolar plate 8, unipolar end plates 14, and the optional gaskets 18 each include a cathode supply aperture 22 and a cathode exhaust aperture 24, a coolant supply aperture 25 and a coolant exhaust aperture 27, and an anode supply aperture 26 and an anode exhaust aperture 28. Supply manifolds and exhaust manifolds of the stack 2 are formed by an alignment of the respective apertures 22, 24, 25, 26, 27, 28 in the sub-gasket 3, bipolar plate 8, unipolar end plates 14, and the gaskets 18. Hydrogen gas is supplied to an anode supply manifold via an anode inlet conduit 30. The oxygen/air is supplied to a cathode supply manifold of the fuel cell stack 2 via a cathode inlet conduit 32. An anode outlet conduit 34 and a cathode outlet conduit 36 are also provided for an anode exhaust manifold and a cathode exhaust manifold, respectively. A coolant inlet conduit 38 is provided for supplying liquid coolant to a coolant supply manifold. A coolant outlet conduit 40 is provided for removing coolant from a coolant exhaust manifold. It should be understood that the configurations of the various inlets 30, 32, 38 and outlets 34, 36, 40 in FIG. 1 are for the purpose of illustration, and other configurations may be chosen as desired.

Figure 2A:
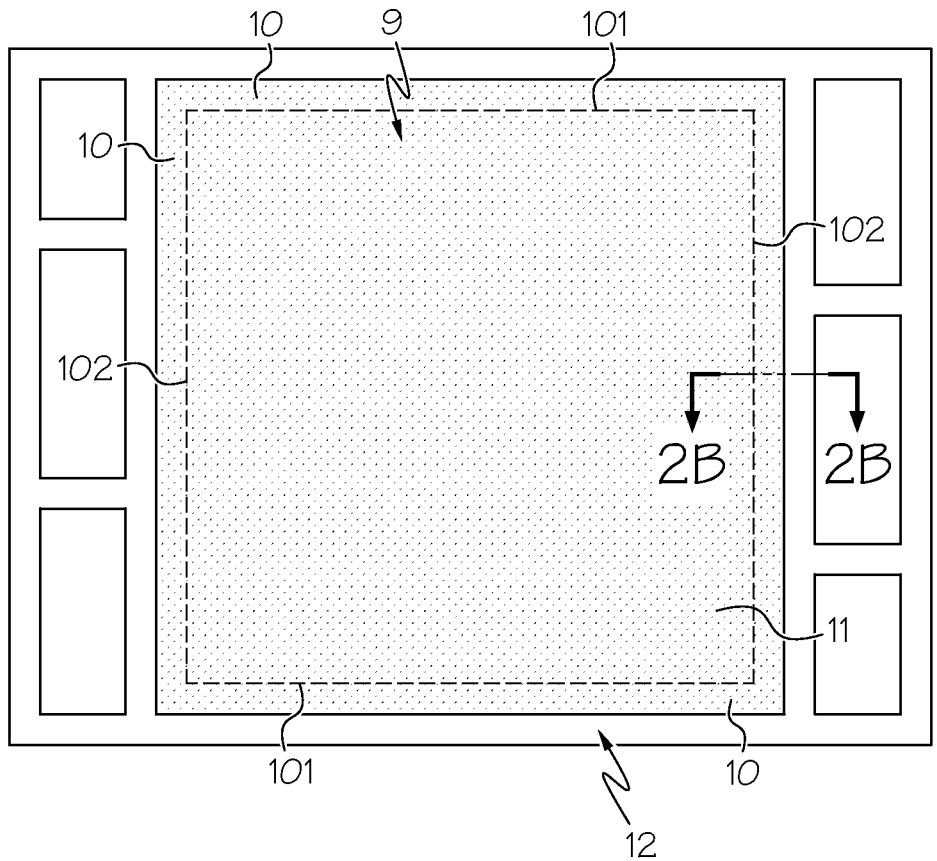
FIG. 2A depicts a schematic view of a cross-section of a UEA illustrating relative location of active and overlap areas.

The arrangement of the components and the relationship between the active area 11, the overlap area 10, the flow directional overlap area edge 101, and the non-flow directional overlap area edge 102 of the UEA 5, may be better understood by reference to FIG. 2. FIG. 2A depicts a schematic cross-sectional perspective view of an exemplary UEA 5 having an inner perimeter of the sub-gasket 3 extending to frame and support the MEA 9. The MEA 9 extends across the active area 11 and terminates prior to the sealing region 12, overlapping the inner perimeter of the sub-gasket 3 to form an overlap area 10 between the MEA 9 and the sub-gasket 3. The overlap area 10 surrounds and abuts the active area 11, although it may be appreciated than an overlap area 10 need not exist on all sides of the active area 11. The outer area of primary concern in the instant disclosure is that long the flow-directional edge 101. It is important that the overlap edges at the flow feed ends, referred to herein as the non-flow directional edges 102, remain free of impeding flow channels and features; whereas it is desirable to have substantially zero flow (bypass) along the flow directional overlap area edges 101.

Figure 2B:
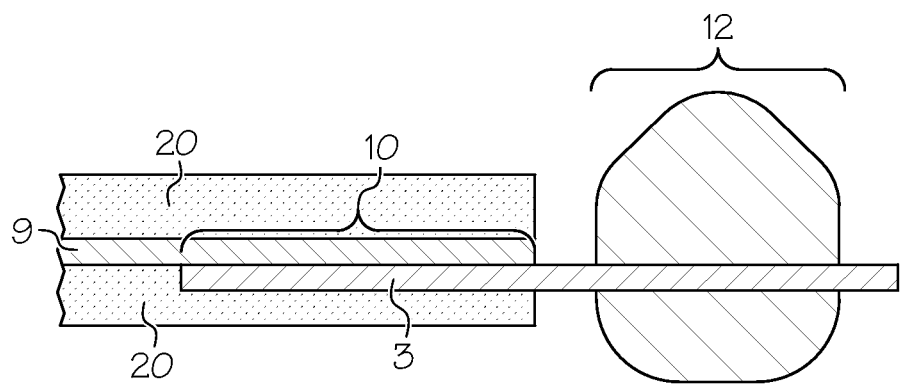
FIG. 2B depicts a sagittal schematic view of one embodiment of an overlap area of the UEA of FIG. 2A.

FIG. 2B depicts a schematic sagittal perspective view of a bracketed portion of the UEA 5 of FIG. 2A, in particular illustrating the overlap area 10. The MEA 9 extends through the active area 11 and overlaps with the inner perimeter of the subgasket 3 to define an overlap area 10 that terminates prior to a seal area 12. DM 20 overlays both sides of MEA 9 across the active area 11, and sandwiches the MEA 9 and sub-gasket 3 of the overlap area 10. In specific embodiments the DM 20 completely covers the overlap area 10 in order to ensure sufficient mechanical pressure across the area. According to other embodiments one or both DM 20 may end prior to or beyond the overlap area 10.

Within the fuel cell stack, when the plates are superimposed over the UEA, the active area and overlap area of the UEA correspond to the active region and overlap region of the plates.

It is important that the overlap region be capable of sustaining mechanical compression sufficient to ensure cross-over sealing between the MEA/membrane and sub-gasket as the membrane is thrifted from the plate edge and seals. To ensure that sufficient mechanical pressure may be sustained across the overlap area, while substantially reducing/preventing reactant and coolant bypass (flow along the overlap region that does not participate in the active area, so is considered "wasted" flow), DM substantially covers the overlap area. Plate channel and land features are designed to provide robust alignment in the corresponding overlap region to avoid channel-over-channel alignments (an alignment between adjacent plates where an anode channel is over a cathode channel across the UEA and is generally an area of low compression) that traverse or predominantly traverse the overlap region, in particular near the center of the overlap region where an overlap area between an MEA and sub-gasket is ensured even with positional tolerances. This desired design element may be evaluated by overlaying the land features of adjacent plates and ensuring that channels on both sides do not traverse the overlap region.

Figure 3:
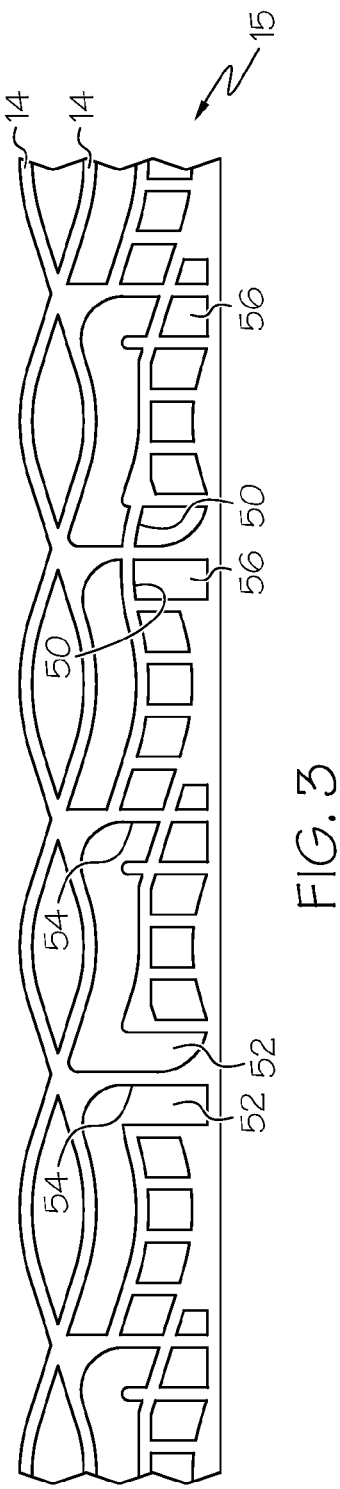
FIG. 3 is a schematic illustration of overlap region features formed by alignment of adjacent plates and overlay of land features in the overlap region.

FIG. 3 illustrates an overlap region 15 configuration modified to satisfy coolant and reactant bypass concerns, and where additional features are added to avoid channel-over-channel alignment within the overlap region, with particular attention being paid to the central band of the overlap region. Achieving compression at a membrane across a channel span is more difficult. FIG. 3 depicts a schematic view of an overlay of land features 50 in the overlap region 15 of adjacent plates 14. Land features 50 are added on different plates 14, so that the open channels 52 across the middle of the overlap region are fixed, but the land features do not combine to create a coolant bypass channel (they are located one on each side of the UEA). Reactant blockages 54 and coolant blockages 56 are formed. Reactant blockages 54 can be seen as lands (coolant volumes) across the overlap region. Coolant blockages 56 can be seen as channels (open spaces) across the overlap region. A reactant blockage 54 prevents a channel (open space) from continuing down the length of the plate. A reactant blockage creates a break within an otherwise continuous channel and the resulting segmented or broken channel continues for the flow directional length of the flow-field of the plate. As is clear, open coolant volume from a mating plate must be considered in the coolant bypass.

The instant disclosure provides stamped flow-field designs wherein the active region comprises a configuration of channel and land features, while the configuration of channel and land features of the overlap region is modified to permit a level of mechanical pressure sufficient to seal the overlap area and to substantially prevent coolant and reactant bypass without impeding coolant and reactant flow in the active area. The overlap region configurations are modified to avoid reactant channel-over-channel features that traverse the overlap region, substantially preventing reactant cross-over leakage. Coolant blockages (channels) across the overlap region are positioned to block coolant bypass and to comport with the requirement that channel-over-channel features be avoided upon alignment of adjacent plates. Reactant blockages (lands) across the overlap region are used to substantially block reactant bypass, and these features are preferably located to avoid locations of low compression (e.g. channel over channel creating the leak path traversing across an overlap area of the MEA/UEA) upon alignment of adjacent plates. Coolant passages of the overlap region are isolated from the active area coolant channels to prevent coolant bypass through sections of the overlap region.

In specific embodiments, reactant channel features of the flow-field plate located in the active region are modified in the overlap region to substantially avoid channel-over-channel alignment between adjacent plates. In specific embodiments the overlap region comprises coolant blocking channel features located to substantially avoid channel-over-channel alignment between adjacent plates. In some embodiments, an overlap region comprising reactant blocking land features located on adjacent plates to avoid land-over-land high compression areas is provided.

Figure 4:
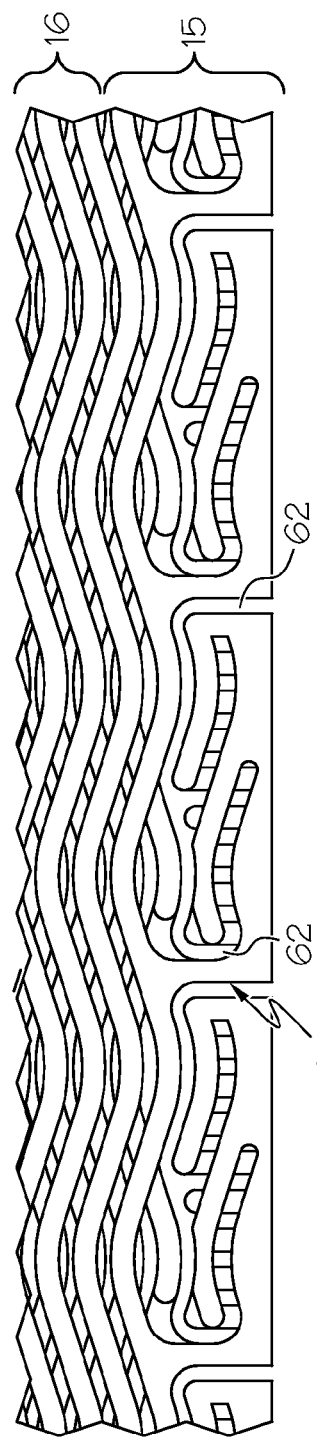
FIG. 4 is a schematic depiction of an area of abutment between an overlap region and active region of a bipolar plate showing an isolated coolant volume of the overlap region interconnected to a coolant passage of the active region to permit venting.

The overlap region is designed to comprise coolant passages, each coolant passage being in fluid communication with active region coolant by a single interconnection. The single coolant connection is provided between a region of isolated coolant passages in the overlap region and the active region coolant channels in order to permit venting for coolant fill, a method of initially filling a fuel cell stack with coolant by drawing a vacuum on the coolant volume to remove air before filling with coolant to reduce the amount of air entrained within the cooling system. A second coolant interconnection between an overlap region and the active area is avoided as this would allow coolant bypass flow through this overlap region. This design element is depicted schematically in FIG. 4. To allow the venting for coolant fill to be effective for the overlap region 15, a single coolant connection 60 is made to the active area 16 from an isolated coolant volume 62 in the overlap region 15.

In preferred embodiments, channel and land features of the overlap region may be crafted to be in substantial mechanical compliance with the channel and land features of the active region. This may be achieved by forming features in both regions of a similar pitch and height. Formed features of the same height facilitate calendaring of the plates to a uniform thickness. In specific embodiments, channel features in the overlap region are formed to be angled with respect to those features in the active region; in particular the features may be orthogonal with respect to one another.

As set forth in FIG. 5, a coolant bypass design according to the disclosure was evaluated using CFD. A 3-channel section of the active region adjacent to the overlap region was evaluated for various design options. These configurations also had periodic coolant and reactant blockages across the edge region.

Figure 5A:
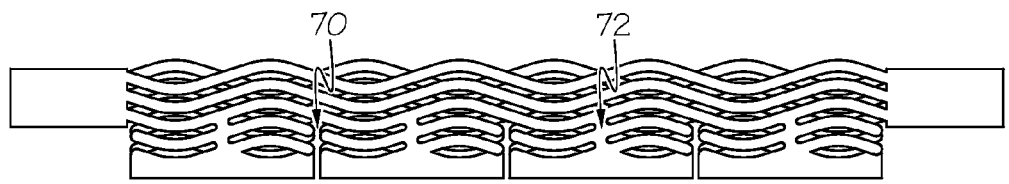
FIGS. 5A, 5B and 5C set forth pressure images generated from computational fluid dynamics (CFD) for three design alternatives of the overlap region
Figure 5B:
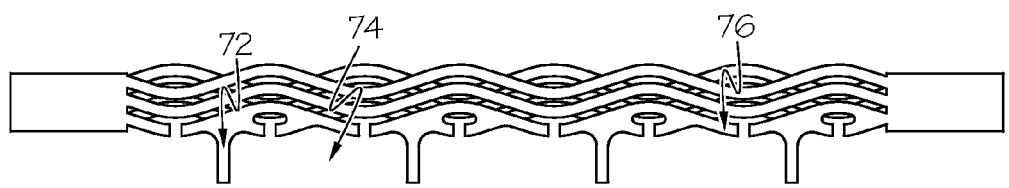
Figure 5C:
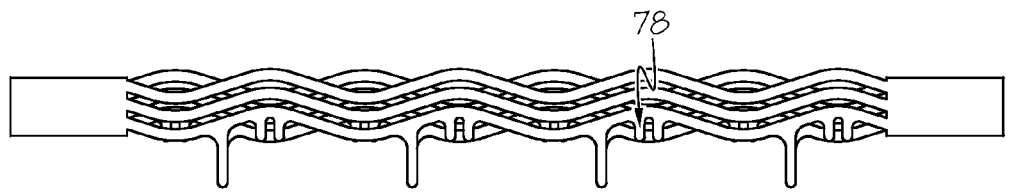
Figure 5D:
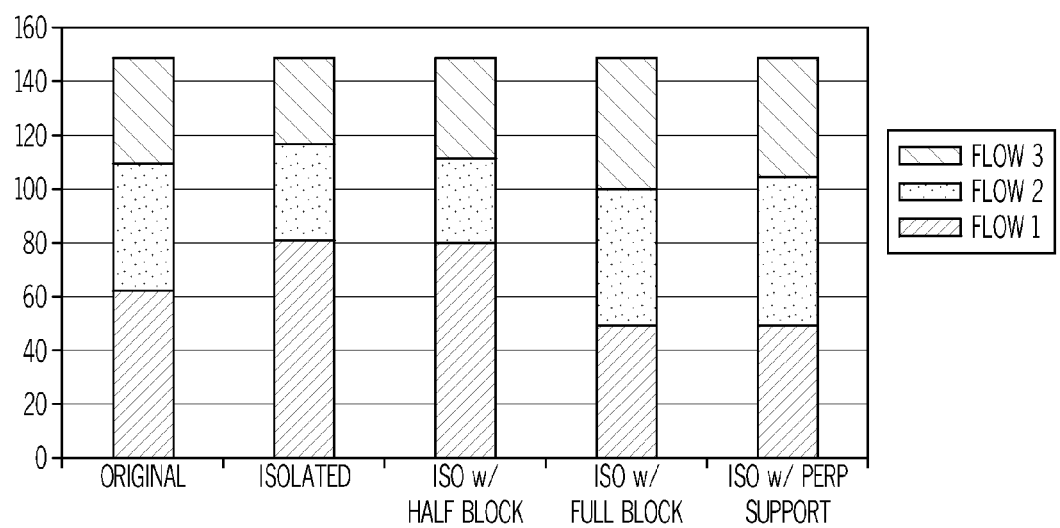
FIG. 5D is a bar graph illustrating the resultant channel flow for the three channels in the active region closest to the overlap region, for each of five design alternatives.

FIG. 5A depicts a pressure image for an original configuration where the active region channel pattern was continued into the overlap region. A coolant blockage 70 and a reactant blockage 72 are shown. FIG. 5D is a bar graph showing the flow in mg/s through the three adjacent active region channels. Ideally, all of the channels would have the same flow, but if the overlap region provides a significant flow path, the first channel, which is nearest the overlap region, will have higher flow (measured at a restriction where the bypass flow is blocked). To address this, in other configurations the coolant passages of the overlap region were isolated from the active region coolant passages. Additional support was needed for the active region channels that looped into the overlap region, so a loop was added. The support loops of this isolated configuration allowed too much flow as they also opened the interconnection space (identified in FIG. 5D as "isolated"). Hence, the interconnection space was blocked on the support loop side (identified in FIG. 5D as "iso w/half block"), which did not improve the relative flow. FIG. 5B illustrates the resulting pressure image for a design wherein the interconnection space is completely blocked. A reactant blockage 72, an isolated coolant volume 74, and a support loop 76 are shown (identified in FIG. 5D as "iso w/full block"). The full blockage was needed to bring the channel flows to similar levels. However, a full blockage may not be desired for local cooling considerations. Hence FIG. 5C depicts another design alternative having perpendicular support 78 and the pressure image resulting therefrom. This design preserves the balanced flow of the full-block design (identified in FIG. 5D as "iso w/perp support), but without the cooling deficiency.

Figure 6A:
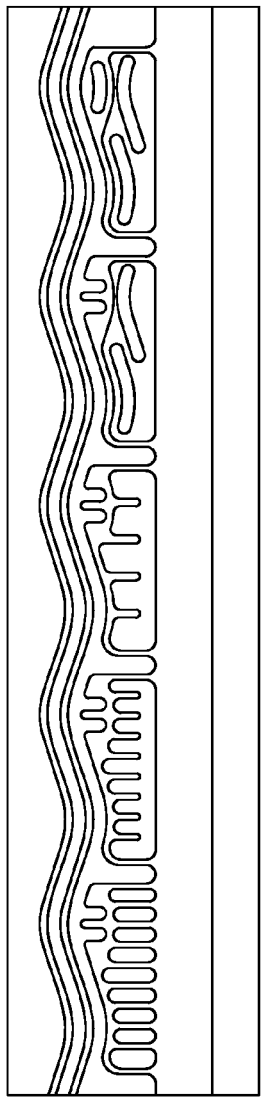
FIG. 6A and FIG. 6B depict five exemplary overlap region modified feature configurations depicted for illustrative purposes on two corresponding adjacent flow-field plates of a single bipolar plate.
Figure 6B:
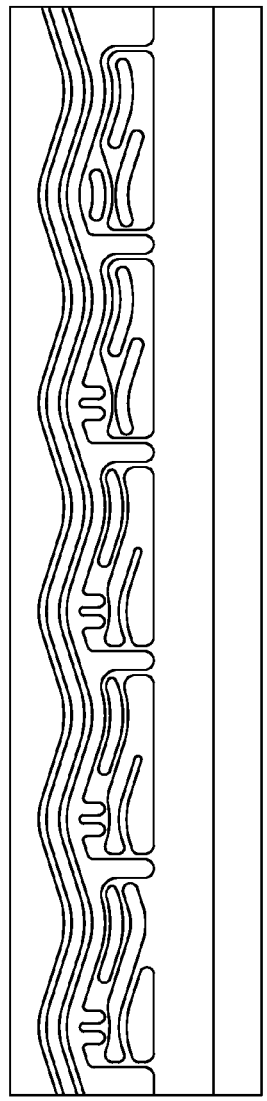
Figure 6C:
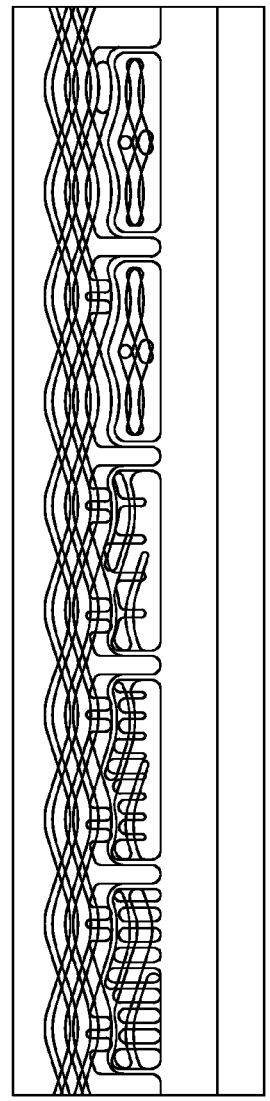
FIG. 6C illustrates the configuration of features formed in the overlap region of the bipolar plate upon alignment of the adjacent plates in FIGS. 6A and 6B.

FIGS. 6A and 6B depict overlap regions and an area of abutment between an active region and the overlap regions of two corresponding flow-field plates. To provide uniform plate compliance, it is desired that the stamped overlap region features be of similar size and alignment as the active area features. For a non-nested plate, the active area channels are not aligned. The overlap region features can be at similar angles (the active area channels are wiggled to prevent nesting of the plates or scissoring of the DM with these fine pitch stamped channels), or nearly orthogonal. Orthogonal features are desirable for bypass flow blockage. The overlap region features are preferably the same height as the active region features to facilitate calendaring of the plates to a uniform thickness. As illustrated in FIGS. 6A and 6B, the overlap region includes a modified configuration of channel and field features forming, for example, isolated coolant volumes, reactant channel blocks, coolant blocks, and coolant interconnections in accordance with the disclosure. Although only five different examples of modified configurations of the overlap region are illustrated, it should be readily appreciated that flow-field plate overlap regions may be stamped or crafted with a variety of modified configurations of channel and land features that are within the scope of the disclosure, and those presented are for illustrative purposes only. FIG. 6C illustrates the pattern of channel and land features formed upon alignment of the corresponding field flow plates depicted in FIGS. 6A and 6B to form a bipolar plate.

While certain representative embodiments and details have been shown for purposes of illustrating specific embodiments of the invention, it will be apparent to those skilled in the art that various changes may be made without departing from the scope of the invention, which is defined in the appended claims.

What is claimed is:

1. A fuel cell stack of at least two fuel cells, each fuel cell comprising a unitized electrode assembly (UEA) comprising a thrifted electrolyte membrane disposed between a pair of electrodes forming a membrane electrode assembly (MEA), the MEA being framed on a sub-gasket such than an overlap exists between an outer perimeter of the MEA and an inner perimeter of the sub-gasket defining an overlap area, the framed MEA being disposed between a pair of gas diffusion media (DM), a pair of stamped flow-field plates, one on each side of a UEA such that flow-field plates of adjacent fuel cells align to form a bipolar plate comprising an active region, a seal region, and an overlap region, said overlap region disposed between an outer perimeter of the active region and an inner perimeter of the seal region and substantially corresponding in area to the overlap area, wherein the active region comprises a configuration of channel and land features and the overlap region comprises a modified configuration of channel and land features, "modified" being with respect to the configuration of channel and land features in the active region, which permit a level of mechanical pressure sufficient to seal the overlap region and to substantially prevent coolant and reactant bypass without impeding coolant and reactant flow in the active area.

2. The fuel cell stack according to claim 1, wherein the MEA and DM have substantially the same area and co-terminate at an outer edge of the overlap area between the MEA and sub-gasket such that DM substantially covers the overlap area.

3. The fuel cell stack according to claim 1 wherein the modified configuration comprises a pattern of channel and land features designed to substantially avoid channel-over-channel alignment between adjacent plates.

4. The fuel cell stack according to claim 1, wherein the modified configuration comprises coolant blocking channel features, said blocking channel features positioned to substantially avoid channel-over-channel alignment between adjacent plates.

5. The fuel cell stack according to claim 1, wherein the modified configuration comprises reactant blocking land features, said blocking land features positioned to substantially avoid land-over-land alignment between adjacent plates.

6. The fuel cell stack according to claim 1, wherein the modified configuration comprises a pattern of channel and land features designed to form substantially isolated coolant passages upon alignment of adjacent plates, each isolated coolant passage being in fluid communication with active area coolant passage by only a single interconnection.

7. The fuel cell stack according to claim 6, wherein the single interconnection of each isolated coolant passage is positioned to permit venting of coolant passages necessary to effectuate coolant fill.

8. The fuel cell stack according to claim 1, wherein the overlap region exhibits substantially the same mechanical compliance as the active region.

9. The fuel cell stack according to claim 8, wherein the overlap region comprises channel and land features configured to substantially avoid channel-over-channel and land-over-land alignment in the overlap region of adjacent plates.

10. The fuel cell stack according to claim 8, wherein the overlap region comprises channel and land features having substantially the same pitch and height as the channel and land features of the active region.

11. The fuel cell stack according to claim 8, wherein the overlap region comprises channel features configured to have an angle similar to or orthogonal to an angle of the channel features of the active region.

12. The fuel cell stack according to claim 11, wherein the overlap region comprises channel features configured to have an angle orthogonal to an angle of the channel features of the active region.

13. The fuel cell stack according to claim 1, wherein the modified configuration comprises: coolant blocking channel features, said blocking channel features located to substantially avoid channel-over-channel alignment between adjacent plates; reactant blocking land features, said land features located to substantially avoid land-over-land alignment between adjacent plates; and a pattern of channel and land features configured to form substantially isolated coolant passages upon alignment of adjacent plates, each isolated coolant passage being in fluid communication with active area coolant passage by only a single interconnection.

14. The fuel cells stack according to claim 13, wherein the coolant blocking channel features are configured to provide a complete coolant passage block.

15. The fuel cell stack according to claim 13, wherein the coolant blocking channel features are configured to provide a partial coolant passage block.

16. The fuel cell stack according to claim 1, wherein the overlap region comprises: a pattern of channel and land features, coolant blocking channel features, and reactant blocking land features designed to substantially avoid channel-over-channel and land-over-land alignment between adjacent plates; isolated coolant passages in fluid communication with an active region coolant passage by only a single interconnection located to permit venting of coolant passages necessary to effectuate coolant fill, further wherein the channel and land features have substantially the same pitch and height as the channel and land features of the active region and wherein the channel features are orthogonally angled to the channel features of the active region.

17. A vehicle comprising at least one fuel cell stack according to claim 1.

18. A fuel cell stack of at least two fuel cells, each fuel cell each fuel cell comprising a unitized electrode assembly (UEA) of a thrifted electrolyte membrane disposed between a pair of electrodes forming a membrane electrode assembly (MEA), the MEA being framed on a sub-gasket such than an overlap exists between an outer perimeter of the MEA and the sub-gasket, the framed MEA being disposed between a pair of gas diffusion media (DM), each UEA being disposed between a pair of stamped flow-field plates, each flow-field plate configured with reactant channel and land features such that alignment of flow-field plates of adjacent fuel cells forms a bipolar plate comprising coolant passages, wherein the plates comprise an active region, a seal region, and an overlap region, said overlap region disposed between an outer perimeter of the active region and an inner perimeter of the seal region and defined as co-extensive in area with the overlap area between the MEA and the sub-gasket, wherein the overlap region comprises a modified configuration of channel and land features, "modified" being with respect to a configuration of channel and land features in the active region, the modified configuration comprising a pattern of channel and land features, coolant blocking channel features, and reactant blocking land features designed to substantially avoid channel-over-channel and land-over-land alignment between adjacent plates, and further designed to form substantially isolated coolant passages upon alignment of adjacent plates, each isolated coolant passage being in fluid communication with active area coolant passage by only a single interconnection positioned to permit venting of coolant passages necessary to effectuate coolant fill, wherein the channel and land features of the overlap region have substantially the same pitch and height as the channel and land features of the active region and the channel features of the overlap region are configured to have an angle similar to or orthogonal to an angle of the channel features of the active region.

19. A vehicle comprising at least one fuel cell stack according to claim 18.

20. A stamped flow-field plate for a fuel cell comprising an active region, an overlap region and a seal region, the overlap region abutting an outer perimeter of the active region and extending to an inner perimeter of the seal region, the active region being configured with channel and land features such that alignment between adjacent flow-field plates forms a bipolar plate comprising a configuration of reactant channel and coolant passages in the active region and a modified configuration of features in the overlap region, "modified" being with respect to the configuration of channel and land features in the active region, the modified configuration comprising one or more of: coolant blocking channel features; reactant blocking land features; substantially isolated coolant passages, each isolated coolant passage in fluid communication with active region coolant flow by only a single interconnection positioned to permit venting of coolant passages necessary to effectuate coolant fill; wherein all features are designed to substantially avoid channel-over-channel and land-over-land alignment between adjacent plates and further wherein the channel and land features of the overlap region have substantially the same pitch and height as the channel and land features of the active region.

* * * * *